United States Patent [19]

Hom

[11] 4,244,435
[45] Jan. 13, 1981

[54] DIRECT DRIVE FOR A MOTOR VEHICLE

[76] Inventor: Hawkins Hom, 818 Morningside Dr., Millbrae, Calif. 94030

[21] Appl. No.: 29,795

[22] Filed: Apr. 13, 1979

[51] Int. Cl.³ .......................... B60K 17/00; B60K 7/00
[52] U.S. Cl. .................................. 180/70 R; 74/664; 180/54 F; 180/297
[58] Field of Search ..................... 180/54 R, 54 F, 55, 180/56, 57, 58, 59, 62, 63, 297, 70 R, 71; 74/664, 665 A, 665 B, 665 C, 665 E, 330, 356; 192/66, 84 A

[56] References Cited

U.S. PATENT DOCUMENTS

| | | | |
|---|---|---|---|
| 1,165,848 | 12/1915 | Chiville | 180/56 |
| 2,420,581 | 5/1947 | Bacon | 180/70 R |
| 3,106,102 | 10/1963 | Clements | 74/359 |
| 3,456,751 | 7/1969 | Sampietro | 74/664 |
| 3,507,113 | 4/1970 | Herrmann | 60/39.16 R |
| 3,537,334 | 11/1970 | Gilbert | 74/675 |

Primary Examiner—John P. Silverstrim
Assistant Examiner—Randall A. Schrecengost
Attorney, Agent, or Firm—Robert K. Rhea

[57] ABSTRACT

A straight drive shaft type engine mounted transversely of a vehicle is provided with a centrally bored drive shaft surrounding a wheel axle having a wheel connected with its respective remote ends. A primary clutch moves a friction disk slip-spline mounted on the axle into driving engagement with a flange on one end of the drive shaft for rotating the axle at the speed of and in the direction of engine drive shaft rotation. A secondary clutch, to be engaged when the primary clutch is disengaged, moves a driving gear into friction engagement with a second flange mounted on the other end portion of the engine drive shaft to connect a transmission with the axle for gear driving or moving the vehicle in reverse.

2 Claims, 1 Drawing Figure

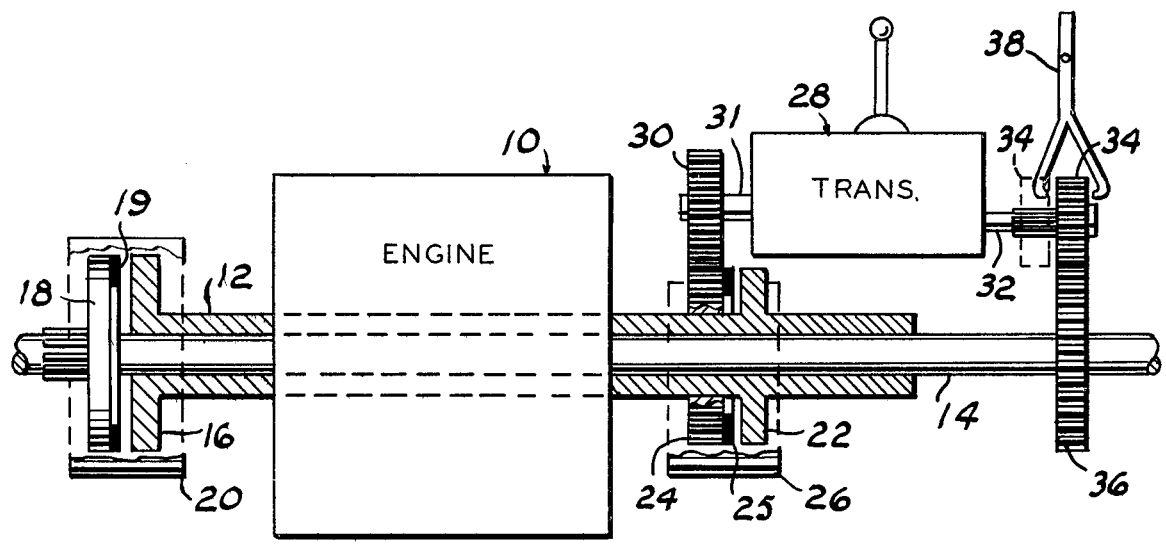

DIRECT DRIVE FOR A MOTOR VEHICLE

BACKGROUND OF THE INVENTION

Field of the Invention

The present invention relates to vehicle drive trains and more particularly to an engine to wheel axle direct drive.

Power transmission patents generally disclose a plurality of gears and pinions selectively engaged for transmitting power from an input to an output shaft. U.S. Pat. No. 3,106,102 discloses turbo couplings mounted on a sleeve surrounding a shaft for transmitting power to an output shaft by a plurality of gear wheels. U.S. Pat. No. 3,507,113 discloses a plurality of housing contained pinion gears axially connecting drive shafts in turn connected with a power turbine and a compressor turbine so that either turbine drives the other. U.S. Pat. No. 3,537,334 discloses a motor driven shaft rotating several gears to power an output shaft which gradually slows down with increase in motor speed until at a certain motor speed the output shaft will stop and then reverse direction with further increase of motor speed.

This invention is distinctive over the above named patents by the engine drive shaft concentrically surrounding and rotating independently of a shaft to be driven with power transmitted from the engine drive shaft to the driven shaft by a clutch so that the driven shaft rotates at the speed of the engine.

SUMMARY OF THE INVENTION

A straight drive shaft type engine transversely mounted in a vehicle is provided with a hollow drive shaft which concentrically surrounds an intermediate portion of an axle having its remote ends drivably connected with a pair of wheels. A primary clutch moves a disk slip spline mounted on the axle into engagement with a first annular flange concentrically formed on one end of the engine drive shaft for transmitting power to the wheel axle and propelling the vehicle. A conventional transmission, mounted in the vehicle adjacent the other end of the engine drive shaft, is drivably engaged with the engine drive shaft by a secondary clutch, energized after disengaging the primary clutch, which moves a drive gear journalled by the engine drive shaft into engagement with a second annular flange formed on the engine drive shaft opposite the primary clutch. The drive gear meshes with a transmission input shaft spur gear and when the transmission is shifted to a desired gear or reverse it drives a pinion on its output shaft in mesh with an axle mounted spur gear for transmitting power to the wheels, such as for reverse.

The principal object of this invention is to increase engine efficiency and obtain more miles per gallon of gasoline by materially conserving the power normally required for operating a conventional drive train, such as the transmission.

BRIEF DESCRIPTION OF THE DRAWING

The single FIGURE is a diagrammatic view, partially in section.

DESCRIPTION OF THE PREFERRED EMBODIMENT

Like characters of reference designate like parts in those figures of the drawings in which they occur.

In the drawings:

The reference numeral 10 indicates a straight drive shaft engine which may be rotary, swash plate or turbine type mounted transversely of a vehicle preferably between the front wheels thereof. The conventional drive shaft of the engine 10 is replaced by a hollow drive shaft 12 which concentrically surrounds an intermediate portion of a one piece axle 14 connected at its respective ends with a pair of wheels through constant-velocity universal joints, neither of which is shown. An outstanding first annular flange 16 is secured to or formed on one end of the engine drive shaft 12 and a disk 18 coaxially surrounds the axle 14 adjacent the flange 16 and is slip-spline secured to the axle. The disk 18 is provided with a friction clutch type surface 19 facing the flange 16. A primary clutch mechanism 20 surrounds the flange 16 and disk 18 for moving the disk into and out of engagement with the flange, as presently explained.

A second outstanding annular flange 22 is secured to or formed on the other end portion of the engine drive shaft and a drive gear 24 is journalled by the engine drive shaft adjacent the second flange 22. The drive gear 24 is similarly provided with a friction clutch surface 25 facing the second flange 22. A secondary clutch mechanism 26, partially surrounding the second flange 22 and drive gear 24, moves the drive gear toward and away from the flange 22 for driving the drive gear 24 at the angular rate of the engine drive shaft.

A conventional gear shifting transmission 28 is mounted in the vehicle adjacent the second flange 22 and includes a spur gear 30 on its input shaft 31. The transmission spur gear 30 is in mesh with the drive gear 24.

The transmission output shaft 32 is provided with a pinion 34 in mesh with an axle gear 36 surrounding and secured to the axle 14 for transmitting engine power to the wheels at a desired speed or for reverse movement of the vehicle. The pinion is slip-spline mounted on the transmission output shaft 32 and moved into and out of mesh with the axle gear 36 by a vehicle connected yoke 38, or the like.

OPERATION

In normal operation, with the engine 10 running and the pinion 34 engaged with the axle gear 36, the secondary clutch 26 is actuated to frictionally engage the drive gear 24 with the drive shaft flange 22 to power the transmission 28. The transmission is shifted through its starting, secondary and high gears to progressively increase the speed of the vehicle, such as for highway driving, at which time the secondary clutch 26 is released and the pinion 34 shifted to its dotted line position. The primary clutch 20 is then engaged to frictionally engage the disk 18 with the drive shaft flange 16 which provides a direct drive between the engine 10 and the axle 14 for driving the vehicle in accordance with the speed of the engine.

Obviously the invention is susceptable to changes or alterations without defeating its practicability. Therefore, I do not wish to be confined to the preferred embodiment shown in the drawings and described herein.

I claim:

1. A direct drive for a wheel supported vehicle having a straight drive shaft type engine with its longitudinal axis disposed transversely of the vehicle adjacent one of the vehicle wheel supporting axle positions, said engine having a hollow drive shaft, said vehicle having a gear shift transmission mounted adjacent one end of said drive shaft, said transmission having a spur gear equipped input shaft and having an output shaft including a pinion slip-spline mounted thereon, the improvement comprising:

first and second annular outstanding flanges secured to the respective end portions of said drive shaft;

a one piece wheel supported axle coaxially surrounded intermediate its ends by said drive shaft;

a disk coaxially slip-spline mounted on said axle ajdacent said first flange,
said flange having a friction clutch surface facing said first flange;

primary clutch means for moving said disk toward and away from said first flange;

a drive gear in mesh with said transmission spur gear and coaxially journalled by said drive shaft adjacent said second flange, said drive gear having a friction clutch surface facing said second flange;

an axle gear mounted on said axle for meshing with said pinion and, secondary clutch means for moving said drive gear toward and away from said second flange.

2. The combination according to claim 1 and further including:

yoke means mounted on said vehicle adjacent said transmission for moving said pinion into and out of mesh with said axle gear.

* * * * *